Patented Aug. 6, 1929.

1,723,083

UNITED STATES PATENT OFFICE.

SAMUEL E. SHEPPARD AND LEON W. EBERLIN, OF ROCHESTER, NEW YORK, ASSIGNORS, BY MESNE ASSIGNMENTS, TO AMERICAN ANODE, INC., A CORPORATION OF DELAWARE.

PROCESS OF MAKING AND ELECTROLYTICALLY DEPOSITING AN AQUEOUS RUBBER EMULSION CONTAINING SULPHUR.

No Drawing. Original application filed January 6, 1923, Serial No. 611,162. Divided and this application filed March 25, 1925. Serial No. 18,304.

This invention relates to processes of making aqueous rubber emulsions containing sulphur. One object of the invention is to provide a relatively simple, inexpensive and certain process of preparing such an emulsion, with the sulphur so associated with the rubber droplets, that it will readily pass with the latter when they are electrodeposited. Other objects will hereinafter appear.

We have discovered that such a process may be carried out by adding sulphur or equivalent vulcanizing agent in colloidal form to the rubber emulsion. This application is a division of our copending application, Serial No. 611,162, filed Jan. 6, 1923, for Rubber emulsion and process of making the same, which application is a continuation in part of our earlier application, Serial No. 540,800, filed March 3, 1922, for Electrodeposition of rubber coatings, from which has matured Patent No. 1,476,374, Dec. 4, 1923.

While the principle of adding the sulphur in colloidal form may be applied to any aqueous rubber emulsion, we shall describe, for purposes of illustration, the application of this principle to a rubber emulsion made in accordance with the disclosure in the above cited prior applications. But it will be understood that our invention is not limited to the details of this example, except as indicated in the appended claims.

Any solution of rubber in any organic solvent is distributed in an aqueous solution of soaps or equivalent emulgents, this mixture being emulsified by agitation, grinding or spraying. Thus we may take 1000 cc. of a 5% solution of rubber (say plantation sheet) in benzol, which is diluted with 1000 cc. of kerosene. To this we may add 500 cc. of sulphonated castor oil (so-called watersoluble oil), and this mixture is then stirred into 3000 cc. of an aqueous solution containing 150 grams of castile soap, which is the main emulsifying agent. The sulphonated castor oil is not indispensable, but is preferred as an auxiliary or intermediate emulsifier, by which term we include any equivalent substance which similarly assists the main emulsifying agent in bringing and maintaining the rubber in the emulsified state. Nor is the kerosene vital, but we prefer to use some such diluent, especially since its quantity is so small as not to appreciably increase the fire hazard during use. It is an inherent characteristic of such emulsions that they are rendered alkaline by the soap which is present, this quality being of prime importance in electrodeposition.

The sulphur in colloidal form is then thoroughly mixed with the emulsion thus prepared. As the preparation of colloidal sulphur, say for instance, by precipitation in water, is old and well known in the chemical art details of its preparation need no description. The amount of it to be mixed with the rubber emulsion will vary in accordance with the effect which is desired. Where the droplets of rubber are to be electrodeposited into a coating in which only partial vulcanization is to be obtained, only correspondingly small amounts of colloidal sulphur need be incorporated in the emulsion. Since the proportions for effecting given results are substantially the same as those used heretofore in ordinary vulcanization, those skilled in this art will readily appreciate how to properly proportion the amount of sulphur or equivalent vulcanizing agent which is used.

We believe that each droplet of rubber in the emulsion carries its proportion of the sulphur, after the latter is properly stirred into the emulsion in the colloidal form, since the sulphur passes with the rubber droplets into the electrodeposited coating. It is noted that the emulsions described above are freely flowable, by reason of their proportions and method of manufacture,—that is, our emulsions have the consistency of and can be poured by gravity like milk and cream.

Having thus described our invention, what we claim as new and desire to secure by Letters Patent is:

1. The process of preparing freely flowable aqueous rubber emulsions containing a vulcanizing agent, which comprises mixing said vulcanizing agent, while in colloidal form, with a freely flowable aqueous alkaline emulsion of unvulcanized rubber until said vulcanizing agent is electrodepositable with the rubber droplets of the emulsion.

2. The process of making a freely flowable aqueous rubber emulsion containing sulphur, which comprises mixing sulphur, while in colloidal form, with a freely flowable aqueous alkaline emulsion of unvulcanized rubber until said sulphur is electrodepositable with the rubber droplets of said emulsion.

3. The herein described process which comprises preparing an alkaline aqueous emulsion of unvulcanized rubber, intimately admixing therewith a colloidal dispersion of sulphur, and depositing out the rupper droplets with the colloidal sulphur particles from the aqueous media to form a solid mass in which the rubber and sulphur particles are intimately associated.

4. The herein described process which comprises preparing an alkaline aqueous emulsion of unvulcanized rubber, intimately admixing therewith a colloidal dispersion of sulphur, simultaneously depositing out the rubber droplets and the sulphur particles from the aqueous media to form a solid mass in which the rubber and sulphur particles are intimately associated, and vulcanizing the rubber so deposited through the intermediary of the colloidal sulphur so deposited.

5. The herein described process which comprises preparing an alkaline aqueous emulsion of unvulcanized rubber, intimately admixing therewith a colloidal dispersion of sulphur, and vulcanizing the rubber through the intermediary of the colloidal sulphur.

6. The process which comprises intimately admixing with an aqueous emulsion of unvulcanized rubber a colloidal dispersion of sulphur, forming from the admixture a self-sustaining mass in which the rubber and sulphur particles are intimately associated, and vulcanizing the rubber.

7. The process which comprises intimately admixing with an aqueous emulsion of unvulcanized rubber a colloidal dispersion of sulphur, forming from the admixture a self-sustaining mass in which the rubber and sulphur particles are intimately associated, drying, and vulcanizing.

Signed at Rochester, New York, this 23rd day of March, 1925.

SAMUEL E. SHEPPARD.
LEON W. EBERLIN.